United States Patent [19]

Carlin

[11] Patent Number: 5,562,312
[45] Date of Patent: Oct. 8, 1996

[54] DISCOUNTINUOUS PLANE WELD APPARATUS AND METHOD FOR ENHANCING FATIGUE AND LOAD PROPERTIES OF SUBTERRANEAN WELL DRILL PIPE IMMEDIATE THE AREA OF SECUREMENT OF PIPE SECTIONS

[75] Inventor: Frank J. Carlin, Houston, Tex.

[73] Assignee: Grant TFW, Inc., Houston, Tex.

[21] Appl. No.: 270,992

[22] Filed: Jul. 5, 1994

[51] Int. Cl.$^6$ .................................................. F16L 13/02
[52] U.S. Cl. .......................... 285/286; 228/168; 403/270
[58] Field of Search ........................... 285/286; 403/270, 403/271; 228/168

[56] References Cited

U.S. PATENT DOCUMENTS

| | | | |
|---|---|---|---|
| 1,325,073 | 12/1919 | Boyd et al. . | |
| 1,450,935 | 4/1923 | Anderson | 403/270 |
| 1,903,852 | 4/1933 | Rollins | 285/286 |
| 2,216,606 | 10/1940 | Taylor | 228/168 X |
| 2,288,094 | 6/1942 | Karmazin | 228/168 X |
| 3,080,179 | 3/1963 | Huntsinger . | |
| 4,416,476 | 11/1983 | Garrett . | |

FOREIGN PATENT DOCUMENTS

| | | | |
|---|---|---|---|
| 836034 | 4/1952 | Germany | 228/168 |
| 397440 | 8/1933 | United Kingdom | 285/286 |

*Primary Examiner*—Dave W. Arola
*Attorney, Agent, or Firm*—Beirne, Maynard & Parsons

[57] ABSTRACT

An apparatus and method are provided for enhancing fatigue and load properties of subterranean well drill pipe immediate the area of securement of pipe sections by providing a weld in a discontinuous plane to secure pipe sections to each other, said weld having a greater cross section of welded surface and ability to distribute stresses which is less prone to fail due to rotational, tensile, and bending stresses, mid due to heavy loads and stresses arising from shock loading.

4 Claims, 1 Drawing Sheet ns
DISCOUNTINUOUS PLANE WELD APPARATUS AND METHOD FOR ENHANCING FATIGUE AND LOAD PROPERTIES OF SUBTERRANEAN WELL DRILL PIPE IMMEDIATE THE AREA OF SECUREMENT OF PIPE SECTIONS

BACKGROUND OF THE INVENTION

1. Field Of The Invention

The invention relates to drill pipe for subterranean wells, and the like, having welds to connect pipe sections to each other.

2. Brief Description Of The Prior Art

When drill pipe is used to drill subterranean wells, the pipe is exposed to bending stresses. Such bending stresses are primarily due to hole curvatures extending through the entire length of the drilled hole. Such stresses may cause fatigue of the drill pipe due to fluctuating reversed bending stress which is imposed during rotation of the drill pipe. During these fluctuating reversed bending stresses, this portion of the pipe is alternately subjected to pressure, tensile, and twisting or torsional forces as the drill pipe rotates. If the drill pipe fails by such resulting fatigue, the location of the fatigue point is oftentimes approximate the area of securement thereof, i.e., from about 1 to about 5 feet from the point of securement of the top end of the pipe to the tool joint. The stress in this portion of the drill pipe is usually considerably higher than the stress that is imposed on the remaining portions of the drill pipe conduit.

If pipe fails by fatigue, the fatigue often originates in a slip mark. Slip marks occur at the end of the pipe attached to the tool joint, because rotatory slips are used to support the drill string during the make and break cycles while drilling and tripping out of a well hole occur. These slips act as wedges that hold the entire weight of the drill string. The portion of the slips that touch the pipe have teeth that can dig into or notch the drill pipe. These notches can act as stress risers that can act as a site for premature fatigue crack initiation and propagation. The above-mentioned bending stresses can initiate these fatigue cracks, thus causing the pipe to fail.

A portion of drill pipe consisting of a thicker, more fatigue-resistant material may be used to resist these higher stresses to diminish the tendency of the pipe to fail by fatigue in the area of securement by slips more often than in other areas of the pipe. The thickened fatigue-resistant section has a wall thickness thicker than the wall thickness of the non-thickened remainder of the drill pipe. The thicker wall thickness of the fatigue-resistant pipe section may be created either by making the outer diameter of the fatigue-resistant section greater, or the inner diameter smaller, or some combination of the two.

The fatigue-resistant section of drill pipe may be secured by flash, friction electron beam, pressure welding, or any other acceptable technique at its lower end to the non-thickened remainder of the drill pipe. The adjoining or top end of the non-thickened remainder must be upset or gradually flared out in wall thickness so that the wall thicknesses of the ends of the thickened and non-thickened sections, as well as the sections' outer and inner diameters, are equal at the ends that are to be secured together.

In the prior art, the welded ends of the thickened and non-thickened sections of the drill pipe string sections were cut at an angle perpendicular to the pipe sections, such that the cross section of the ends are circular. When the pipe string sections are welded together using such circular welds, the aforementioned fluctuating reversed bending stresses tend to impose high stresses on the circular weld. Additionally, heavy loads imposed on the pipe string as well as shock loading put high stress on the weld. Thus, even where a thickened, fatigue-resistant section is incorporated into the pipe string in order to be more resistant to failure due to fatigue caused by slips, failure may still occur at the weld due to these stresses. Obviously, if the circular weld fails, the increased resistance to failure of the thickened section is not as beneficial as it would be were the weld more hardy.

Applicant is aware of the following prior art which is addressed to similar problems of stress on subterranean well conduits, but which does not anticipate or render obvious the present invention: (1) U.S. Pat. No. 4,416,476, issued Nov. 22, 1983, and entitled "Intermediate Weight Drill Stem Member"; (2) U.S. Pat. No. 1,325,073, issued Dec. 16, 1919, and entitled "Method Of Forming Coupling Ends On Drill Tube Sections"; and (3) U.S. Pat. No. 3,080,179, issued Mar. 5, 1963, and entitled "Slip Engaging Portion of Drill String Formed of Increased Wall Thickness and Reduced Hardness."

The present invention addresses some of the deficiencies of the prior art's use of circular welds to secure the thickened, fatigue-resistant section of pipe to the remainder of the pipe, by the use of a helical weld having increased cross section and thus improved resistance to stress and also due to its helical shape.

SUMMARY OF THE INVENTION

The present invention provides an apparatus and method for enhancing fatigue and load properties of a subterranean well drill pipe string section immediate the area of securement of pipe sections by providing a weld in a discontinuous plane to secure the pipe sections to each other, in particular to connect a thickened, fatigue-resistant pipe section to the non-thickened remainder of the pipe.

The drill pipe string section comprises a first tool joint, a thickened pipe section, a non-thickened pipe section, and a second tool joint. A first tool joint weld secures the first end of the thickened pipe section to the first tool joint, while a helical weld secures the second end of the thickened pipe section to the first end of the non-thickened pipe section. A second tool joint weld secures the second end of the non-thickened pipe section to the second tool joint.

The first and second tool joint welds may comprise any known and conventional welding processes, including flash, friction, or pressure welding, or welding by electron beam, laser, or other known means.

As used in this application, "discontinuous weld" or "discontinuous plane" refers to the weld connecting the thickened pipe section to the non-thickened pipe section, where the ends of the pipe sections are cut at matching angles thereby creating helical, scalloped, sinusoidal, elliptical or other geometrical shaped ends, where the inner and outer diameters of the walls of these sections are equal at their juncture, and where these ends are welded together by known and conventional welding processes, such as flash or pressure welding, or welding by electron beam, laser, or other known means. This results in an increase of the cross-sectional area across the weld, in a discontinuous plane.

Because the weld is helical in shape, the fluctuating reversed tensile, bending, and torsional stresses imposed during rotation of the drill pipe impose less stress on the helical weld than on prior art welds which are not helical. Moreover, the helical weld provides a greater cross section of weld which also allows a greater amount of these stresses to be tolerated by the helical weld. The helical weld also makes the load carrying capacity of the weld greater than prior art circular welds with smaller cross section, and makes the helical weld more resistant to damage caused by shock loading. Thus, when the thickened pipe section is welded to a non-thickened portion to incorporate the thickened pipe section into the drill pipe string section to reduce the tendency to fail in this region, the use of a helical weld instead of a circular weld reduces the likelihood of failure of the weld due to the fluctuating reversed tensile, bending, and torsional stresses imposed during rotation of the drill pipe and due to shock loading and heavy loading on the drill pipe string section.

DESCRIPTION OF THE PREFERRED EMBODIMENT

Figure 2:
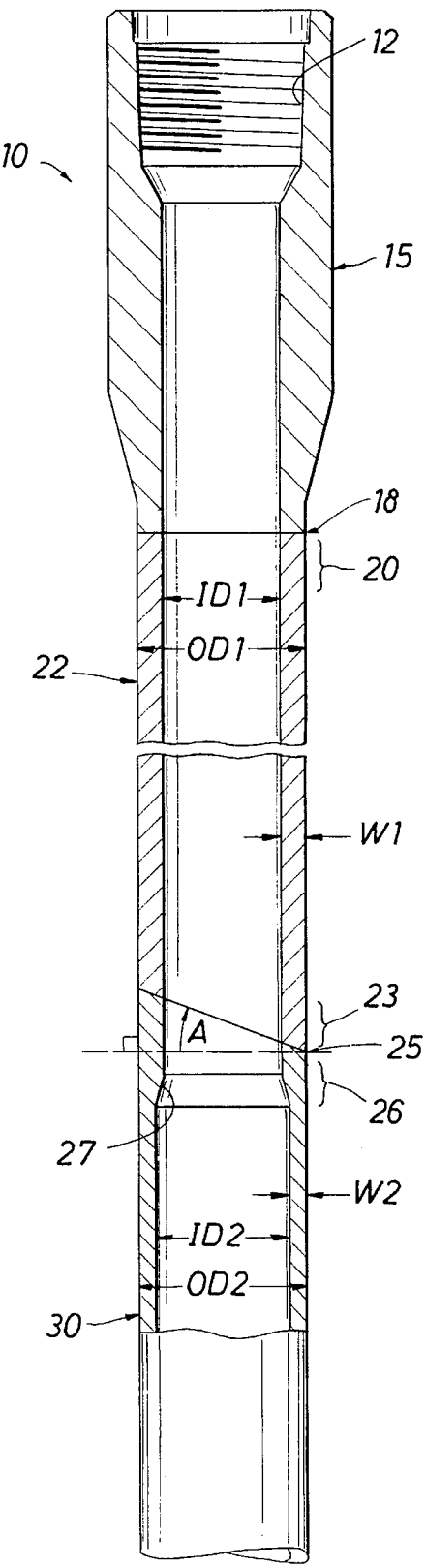
FIG. 2 is a longitudinal section through the upper portion of a drill pipe string section embodying the invention, the lower portion being shown in side elevation.

Now referring to FIG. 2, there is shown the significant portions of a drill pipe string section 10 embodying the invention which, as shown, consists of a first tool joint 15 and a second tool joint (not shown), and thickened and non-thickened pipe sections 22 and 30. The tool joint 15 contains threads 12 which are used to connect the drill pipe string section 10 to other drill pipe string sections (not shown) which comprise a drill pipe string. The thickened pipe section 22 is secured at its first end 20 to the first tool joint 15 by a first tool joint weld 18. The thickened pipe section 22 is typically from three to six feet in length and is used to resist fatigue caused by the action of slips that engage the drill pipe string section 10 in the area of the thickened pipe section 22. The thickened pipe section 22 has a wall thickness W1 that is greater than the wall thickness W2 of the non-thickened pipe section 30, and therefore is more resistant to fatigue caused by slips and other stresses than the non-thickened pipe section 30.

The wall thickness W1 is created in the preferred embodiment by the use of an inner diameter ID1 that is smaller than the inner diameter ID2 of the non-thickened pipe section 30, where the outer diameters OD1 and OD2 of the thickened and non-thickened pipe section 22 and 30 are the same. However, it will be appreciated that the thickness W1 may be made greater than W2 by the use of an outer diameter OD1 that is larger than outer diameter OD2 with the inner diameters ID1 and ID2 being the same; or by some other outer and inner diameter sizes.

Figure 1:
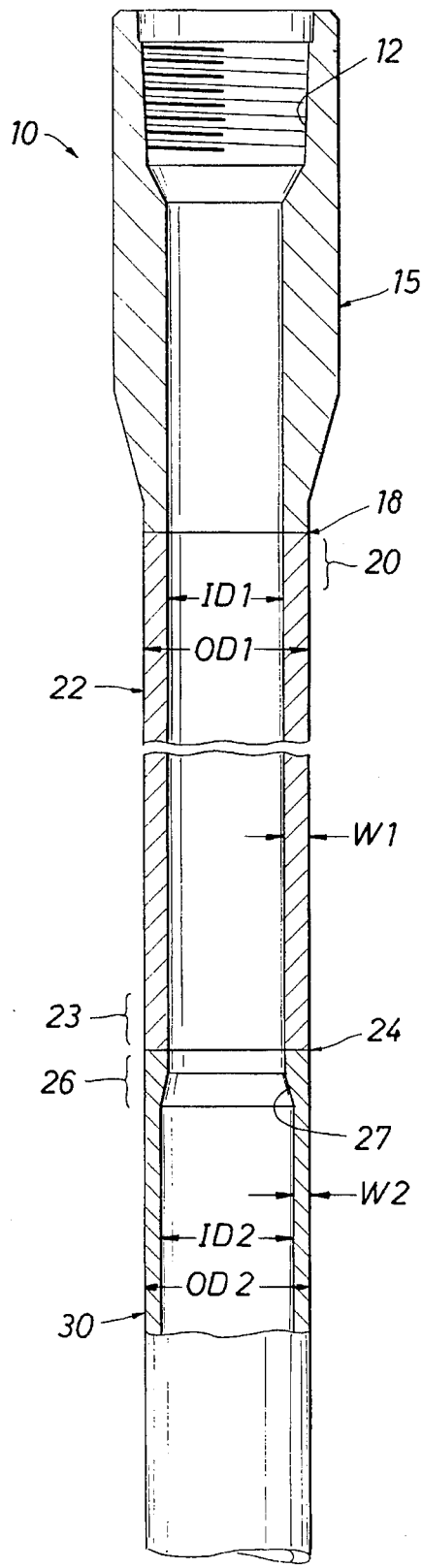
FIG. 1 is a longitudinal section through the upper portion of a prior art drill pipe string section having a circular weld, the lower portion being shown in side elevation.

In the prior art as shown in FIG. 1, the thickened pipe section 22 is secured at its second end 23 to the first end 26 of the non-thickened pipe section 30 by a conventional or circular weld 24. In the preferred embodiment of the invention as shown in FIG. 2, the thickened pipe section 22 is secured at its second end 23 to the first end 26 of the non-thickened pipe section 30 by a helical weld 25 which is more resistant than a circular weld 24 to stresses imposed on the weld due to shock loading, heavy loading, and due to reversed fluctuating rotational stresses as hereinabove explained.

Now referring once more to FIG. 2 showing the preferred embodiment of the invention, the first end 26 of the non-thickened pipe section 30 contains an upset 27 such that the inner diameter ID2 of the non-thickened pipe section 30 decreases to match the inner diameter ID1 of the thickened pipe section 22. The second end 23 of the thickened pipe section 22 and the first end 26 of the non-thickened pipe section 30 are cut at matching helical angles, the angles being A degrees from a plane perpendicular to the pipe sections 22 and 30 as shown in FIG. 2, so that the ends 23 and 26 may be joined by welding at the helical weld 25. In the preferred embodiment of the invention the angle A may be approximately 30°, although it will be appreciated that any other angle that is practicable and achieves the helical weld's beneficial properties may be utilized so that the resulting cross-sectional area of the weld is not in one plane.

The non-thickened pipe section 30 is secured at its second end (not shown) to the second tool joint (not shown) by a second tool joint weld or other conventional securing means.

Although this embodiment of the invention discloses a drill pipe string section with only two pipe sections 22 and 30, it will be appreciated that the drill pipe string section may comprise a multiplicity of pipe sections, in which case each pipe section will be secured to adjoining pipe sections via securing means such as welds. Additionally, although this embodiment of the invention discloses a helical weld 25 to secure the thickened and the non-thickened sections to each other, a helical weld may also be used instead of the conventional welds to secure pipe sections 22 and 30 to their adjoining tool joints, or to secure any pipe sections in the drill pipe string section 10 to each other.

Because the helical weld 25 is shown as preferably helical in shape, the fluctuating reversed tensile, bending, and torsional stresses imposed during rotation of the drill pipe string section 10 impose less stress on the helical weld 25 than on prior art welds that are not helical, such as the circular weld 24 shown in the prior an drill pipe string section of FIG. 1. Moreover, the helical weld 25 provides a greater cross section of welded surface of the ends 23 and 26, which also allows a greater amount of these stresses to be tolerated by the helical weld 25. The greater cross section of the helical weld 25 also resists more strongly than in the prior art the fluctuating reversed tensile, bending, and torsional stresses and makes the load carrying capacity of the drill pipe string section 10 at the helical weld 25 greater than the prior art circular weld 24 with smaller cross section, and also makes the helical weld 25 more resistant to damage caused by shock loading than is the prior art circular weld 24°

Although the invention has been described in terms of specified embodiments that are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What Is Claimed And Desired To Be Secured By Letters Patent Is:

1. A drill pipe string section for enhancing fatigue and load properties of a subterranean well drill pipe string immediate the area of securement of pipe sections, comprising:

(a) a tool joint having first and second ends, said first end of said tool joint having threads whereby said drill pipe string section may be secured to said drill pipe string;

(b) a thickened pipe section for increased resistance to failure having first and second ends, a wall thickness, an inner diameter, and an outer diameter, wherein said first end of the thickened pipe section is secured to the second end of said tool joint, further wherein said second end of the thickened pipe section is cut at an angle A degrees from a plane perpendicular to said thickened pipe section whereby said second end of the thickened pipe section is helical; and (c) a non-thickened pipe section having a first end, a length, a wall thickness, an inner diameter, and an outer diameter, said wall thickness of said non-thickened pipe section being less than the wall thickness of said thickened pipe section throughout substantially all of the length of said non-thickened pipe section, wherein said first end of the non-thickened pipe section is cut at an angle A degrees from a plane perpendicular to said non-thickened pipe section whereby said first end of the non-thickened pipe section is helical, further wherein said non-thickened pipe section is upset at its first end whereby the inner diameter, outer diameter, and wall thickness of said non-thickened pipe section at its first end are equal to the inner diameter, outer diameter, and wall thickness, respectively, of said thickened pipe section, further wherein said first end of said non-thickened pipe section is secured to the second end of the thickened pipe section by a helical weld.

2. A method for enhancing fatigue and load properties of a subterranean well drill pipe string having drill pipe string sections immediate the area of securement of pipe sections, comprising:

(a) providing a tool joint having first and second ends, said first end of said tool joint having threads whereby said drill pipe string section may be secured to said drill pipe string;

(b) providing a thickened pipe section for increased resistance to failure having first and second ends, a wall thickness, an inner diameter, and an outer diameter, wherein said first end of the thickened pipe section is secured to the second end of said tool joint, further wherein said second end of the thickened pipe section is cut at an angle A degrees from a plane perpendicular to said thickened pipe section whereby said second end of the thickened pipe section is helical;

(c) providing a non-thickened pipe section having a first end, a length, a wall thickness, an inner diameter, and an outer diameter, said wall thickness of said non-thickened pipe section being less than the wall thickness of said thickened pipe section throughout substantially all of the length of said non-thickened pipe section, wherein said first end of the non-thickened pipe section is cut at an angle A degrees from a plane perpendicular to said non-thickened pipe section whereby said first end of the non-thickened pipe section is helical, further wherein said non-thickened pipe section is upset at its first end whereby the inner diameter, outer diameter, and wall thickness of said non-thickened pipe section at its first end are equal to the inner diameter, outer diameter, and wall thickness, respectively, of said thickened pipe section; and (d) welding said first end of said non-thickened pipe section to the second end of the thickened pipe section whereby a helical weld secures said non-thickened pipe section to said thickened pipe section.

3. A drill pipe string: section for enhancing fatigue and load properties of a subterranean well drill pipe string immediate the area of securement of pipe sections, comprising:

(a) a tool joint having first and second ends, said first end of said tool joint having threads whereby said drill pipe string section may be secured to said drill pipe string;

(b) a thickened pipe section for increased resistance to failure having first and second ends, a wall thickness, an inner diameter, and an outer diameter, wherein said first end of the thickened pipe section is secured to the second end of said tool joint, further wherein said second end of the thickened pipe section is cut at an angle A degrees from a plane perpendicular to said thickened pipe section whereby said second end of the thickened pipe section is in a discontinuous plane; and (c) a non-thickened pipe section having a first end, a length, a wall thickness, an inner diameter, and an outer diameter, said wall thickness of said non-thickened pipe section being less than the wall thickness of said thickened pipe section throughout substantially all of the length of said non-thickened pipe section, wherein said first end of the non-thickened pipe section is cut at an angle A degrees from a plane perpendicular to said non-thickened pipe section whereby said first end of the non-thickened pipe section is in a discontinuous plane, further wherein said non-thickened pipe section is upset at its first end whereby the inner diameter, outer diameter, and wall thickness of said non-thickened pipe section at its first end are equal to the inner diameter, outer diameter, and wall thickness, respectively, of said thickened pipe section, further wherein said first end of said non-thickened pipe section is secured to the second end of the thickened pipe section by a weld in a discontinuous plane.

4. A method for enhancing fatigue and load properties of a subterranean well drill pipe string having drill pipe string sections immediate the area of securement of pipe sections, comprising:

(a) providing a tool joint having first and second ends, said first end of said tool joint having threads whereby said drill pipe string section may be secured to said drill pipe string;

(b) providing a thickened pipe section for increased resistance to failure having first and second ends, a wall thickness, an inner diameter, and an outer diameter, wherein said first end of the thickened pipe section is secured to the second end of said tool joint, further wherein said second end of the thickened pipe section is cut at an angle A degrees from a plane perpendicular to said thickened pipe section whereby said second end of the thickened pipe section is in a discontinuous plane;

(c) providing a non-thickened pipe section having a first end, a length, a wall thickness, an inner diameter, and an outer diameter, said wall thickness of said non-thickened pipe section being less than the wall thickness of said thickened pipe section throughout substantially all of the length of said non-thickened pipe section, wherein said first end of the non-thickened pipe section is cut at an angle A degrees from a plane perpendicular to said non-thickened pipe section whereby said first end of the non-thickened pipe section is in a discontinuous plane, further wherein said non-thickened pipe section is upset at its first end whereby the inner diameter, outer diameter, and wall thickness of said non-thickened pipe section at its first end are equal to the inner diameter, outer diameter, and wall thickness, respectively, of said thickened pipe section; and (d) welding said first end of said non-thickened pipe section to the second end of the thickened pipe section whereby a weld in a discontinuous plane secures said non-thickened pipe section to said thickened pipe section.

* * * * *